(12) United States Patent
Ohsawa

(10) Patent No.: US 7,905,212 B2
(45) Date of Patent: Mar. 15, 2011

(54) BALANCER APPARATUS OF ENGINE

(75) Inventor: Hiroshi Ohsawa, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 405 days.

(21) Appl. No.: 12/220,755

(22) Filed: Jul. 28, 2008

(65) Prior Publication Data

US 2009/0038575 A1 Feb. 12, 2009

(30) Foreign Application Priority Data

Aug. 10, 2007 (JP) .................................. 2007-208773

(51) Int. Cl.
*F02B 75/06* (2006.01)
(52) U.S. Cl. .................. 123/196 R; 123/192.2
(58) Field of Classification Search ............... 123/192.2, 123/196 R; 74/603, 604; 184/6.4, 6.5
See application file for complete search history.

(56) References Cited

U.S. PATENT DOCUMENTS 6,718,934 B2   4/2004 Ohsawa
6,758,183 B2 * 7/2004 Endo et al. .................. 123/192.2

FOREIGN PATENT DOCUMENTS

JP 2003-113898 4/2003
JP 2003-129816 5/2003

* cited by examiner

*Primary Examiner* — Noah Kamen
(74) *Attorney, Agent, or Firm* — Flynn, Thiel, Boutell & Tanis, P.C.

(57) ABSTRACT

A pump chamber is arranged on the side of a balancer shaft on a vehicle backward side of the two balancer shafts. An oil strainer for sucking oil into an inlet passage is arranged on a vehicle forward side of the axis of the balancer shaft on the vehicle forward side of said two balancer shafts. The inlet passage and the delivery passage are overlaid in the vertical direction and oriented to one side in the circumferential direction of the pump chamber, and the inlet passage and the delivery passage are arranged in a state where they are rectilinearly extended from the pump chamber in the vehicle forward direction.

3 Claims, 3 Drawing Sheets

BALANCER APPARATUS OF ENGINE

FIELD OF THE INVENTION

The invention relates to a balancer apparatus for an internal combustion engine, and more particularly to a balancer apparatus for an engine in which an oil pump has been integrally assembled.

BACKGROUND OF THE INVENTION

In a 4-cycle, 4-cylinder internal combustion engine for a vehicle, a secondary inertia force occurs at a center of gravity of a piston-connecting rod system in terms of its layout.

As means for setting off or balancing the secondary inertia force, the engine has a balancer apparatus for rotating a balancer shaft at a speed that is twice as fast as engine rotational speed.

JP-A-2003-113898 discloses a mounting method for a balancer apparatus that includes integrally assembling the balancer apparatus with a cylinder block or attaching the balancer apparatus to either a lower crank casing or to an oil pan located just under a crank shaft.

In the case of the mounting method of attaching the balancer apparatus to the lower crank casing or to the oil pan just under the crank shaft, in order to realize a compact size, there is a layout in which the balancer apparatus and an oil pump are integrated.

Generally, in such a layout a pump rotor of the oil pump rotates coaxially with the balancer shaft and it is necessary to rotate the pump rotor at a speed which is twice as fast as the engine rotational speed. Therefore, it is necessary to construct an inlet passage and a delivery passage as oil passages located before and after the pump rotor to provide an oil flow that is as smooth as possible.

Hitherto, in the balancer apparatus for an internal combustion engine disclosed in JP-A-2003-129816, a receiving portion of a relief valve for adjusting a discharge pressure of the oil pump is integrally provided with the housing and the relief valve is arranged at a position away from an extension of the inlet passage, thereby simplifying oil passage construction and realizing a compact size for the entire apparatus.

In the housing of the balancer apparatus for the engine, an attaching portion of an oil strainer is integrally formed at a lower position of the balancer shaft on the lower side between the two balancer shafts, thereby miniaturizing the apparatus.

Hitherto when the balancer apparatus and the oil pump are integrally arranged to realize the compact size, it is difficult to smoothly construct the oil inlet passage and the oil delivery passage located before and after the pump rotor, respectively. This problem causes discharge performance of the oil pump to deteriorate and drive loss of the oil pump to increase.

In the case of the transverse front positioned engine/front-wheel drive (FF) engine, it is desirable that the oil strainer is arranged in front of the vehicle so as to avoid air suction during vehicle deceleration. In this case, however, the oil passage to the oil strainer becomes too long and thus mountability of the balancer apparatus to the engine deteriorates.

Therefore, an object of the invention is to provide a balancer apparatus for an engine, such as an internal combustion engine, in which discharge performance of an oil pump and mountability to the engine are improved.

SUMMARY OF THE INVENTION

According to the invention, there is provided a balancer apparatus of an engine in which a balancer apparatus housing for enclosing two balancer shafts which are rotated at twice the speed of a crank shaft is arranged under a cylinder block whose cylinder center line is inclined in a forward direction of a vehicle. An oil pump driven by the balancer shafts is attached to an edge portion in a longitudinal direction of the housing, and a pump chamber of the oil pump, an inlet passage for sucking oil into the pump chamber, and a delivery passage for discharging the oil from the pump chamber are formed in the housing, wherein the pump chamber is arranged on the side of the balancer shaft on the vehicle backward side of the two balancer shafts, an oil strainer for sucking the oil into the inlet passage is arranged on the vehicle forward side of an axis of the balancer shaft on the vehicle forward side of said two balancer shafts, the inlet passage and the delivery passage are overlaid in the vertical direction to one side in the circumferential direction of the pump chamber, and the inlet passage and the delivery passage are arranged in a state wherein they rectilinearly extend from the pump chamber in the vehicle forward direction.

According to the balancer apparatus of the engine of the invention, since the oil passages located before and after the pump rotor of the oil pump are allowed to have a structure in which bending amounts are small and a large space is unnecessary, the discharge performance of the oil pump can be improved and the mountability of the balancer apparatus to the engine can be improved.

According to the balancer apparatus of the vehicle engine, an oil strainer is arranged at a position where oil is collected, thereby preventing an oil shortage. A space adapted to arrange an inlet passage and a delivery passage without being bent can be provided between a pump chamber and the strainer. Thus drive loss of an oil pump is reduced, a miniaturization of the balancer apparatus can be realized, and mountability of the balancer apparatus to the engine can be improved.

According to the invention, the discharge performance of the oil pump and the mountability of the balancer apparatus to the engine are improved by constructing the oil passages before and after the pump rotor of the oil pump so as to have the structure in which bending amounts are small and a large space is unnecessary.

An embodiment of the invention will be specifically described in detail hereinbelow with reference to the drawings.

DETAILED DESCRIPTION OF THE INVENTION

Figure 1:
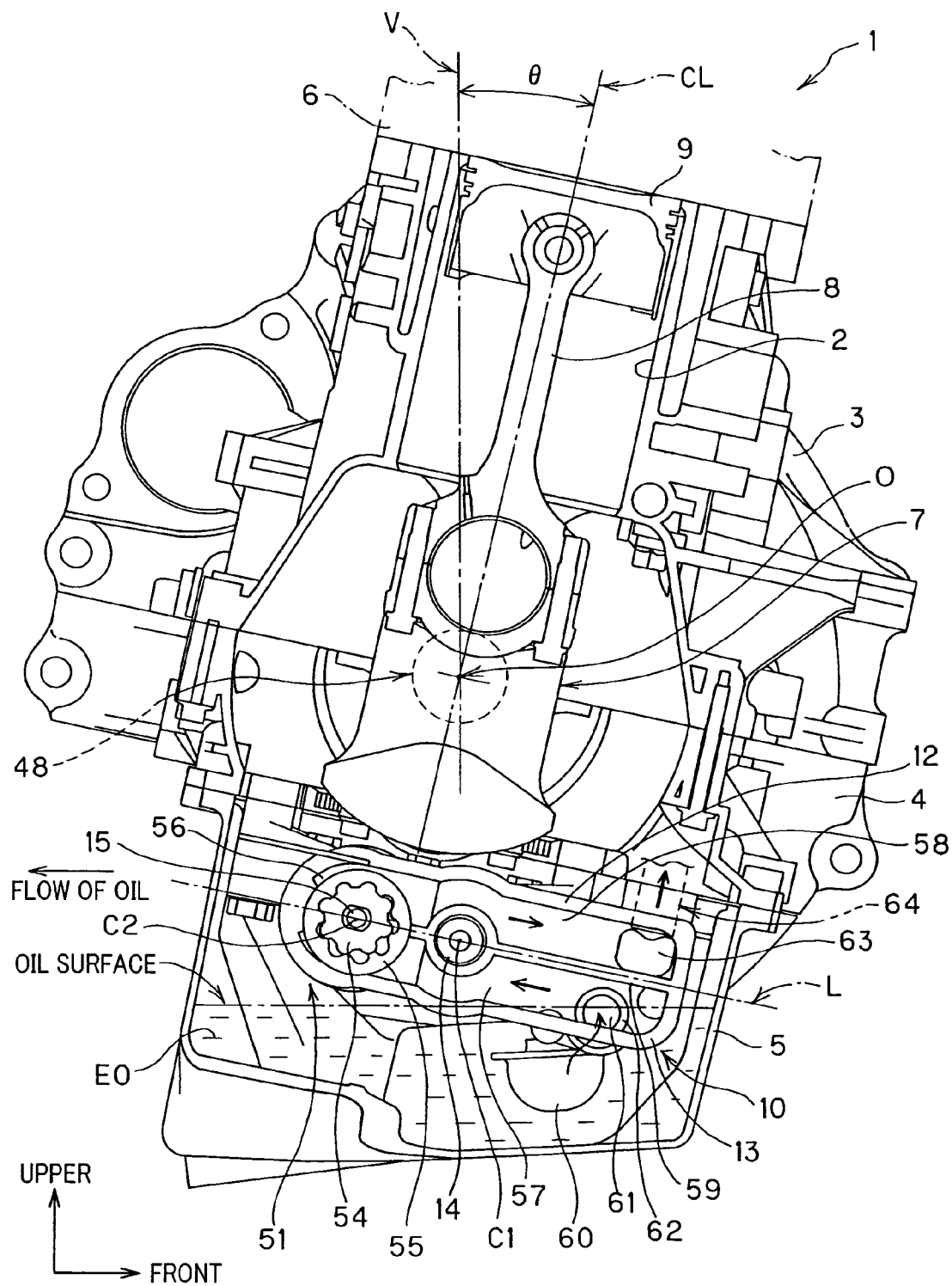
FIG. 1 is a cross-sectional view of an engine mounted to a vehicle in an inclined state.
Figure 2:
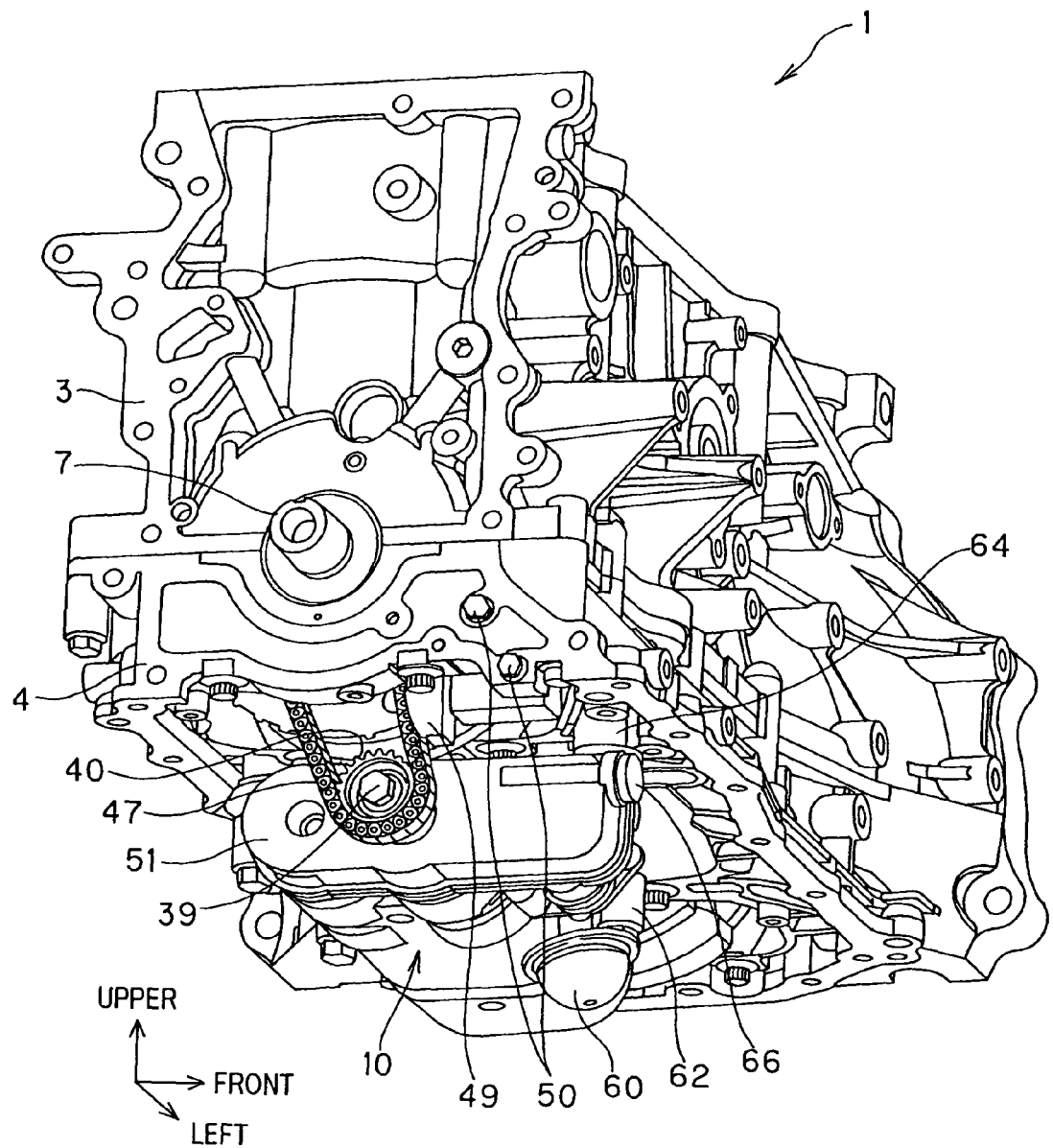
FIG. 2 is a perspective view of the engine having a balancer apparatus as viewed from an oblique lower direction.

In FIGS. 1 and 2, reference numeral 1 denotes a 4-cycle 4-cylinder internal combustion engine 1 (hereinbelow, referred to as an "engine") for a vehicle. The engine 1 has: a cylinder block 3 formed with a cylinder 2; a lower crank casing or lower crank case 4 attached to a lower surface of the cylinder block 3; an oil pan 5 attached to a lower surface of the lower crank casing 4; and a cylinder head 6 attached to an upper surface of the cylinder block 3.

A crank shaft 7 is axially supported between the cylinder block 3 and the lower crank casing 4. A piston 9 that reciprocates in the cylinder 2 of the cylinder block 3 is coupled with the crank shaft 7 through a connecting rod 8.

As illustrated in FIG. 1, the engine 1 is mounted in the vehicle in a state wherein a cylinder center line CL of the cylinder 2 of the cylinder block 3 is inclined from a vertical line V in a forward direction of the vehicle by an angle θ from a crank axis O and in a transverse (FF) state.

As shown in FIG. 1, a balancer apparatus 10 is arranged under the cylinder block 3 of the engine 1, that is, in the oil pan 5 at the lower surface of the lower crank casing 4. The balancer apparatus 10 can set off a secondary inertia force at a center of gravity of the piston 9/connecting rod 8 system.

Figure 3:
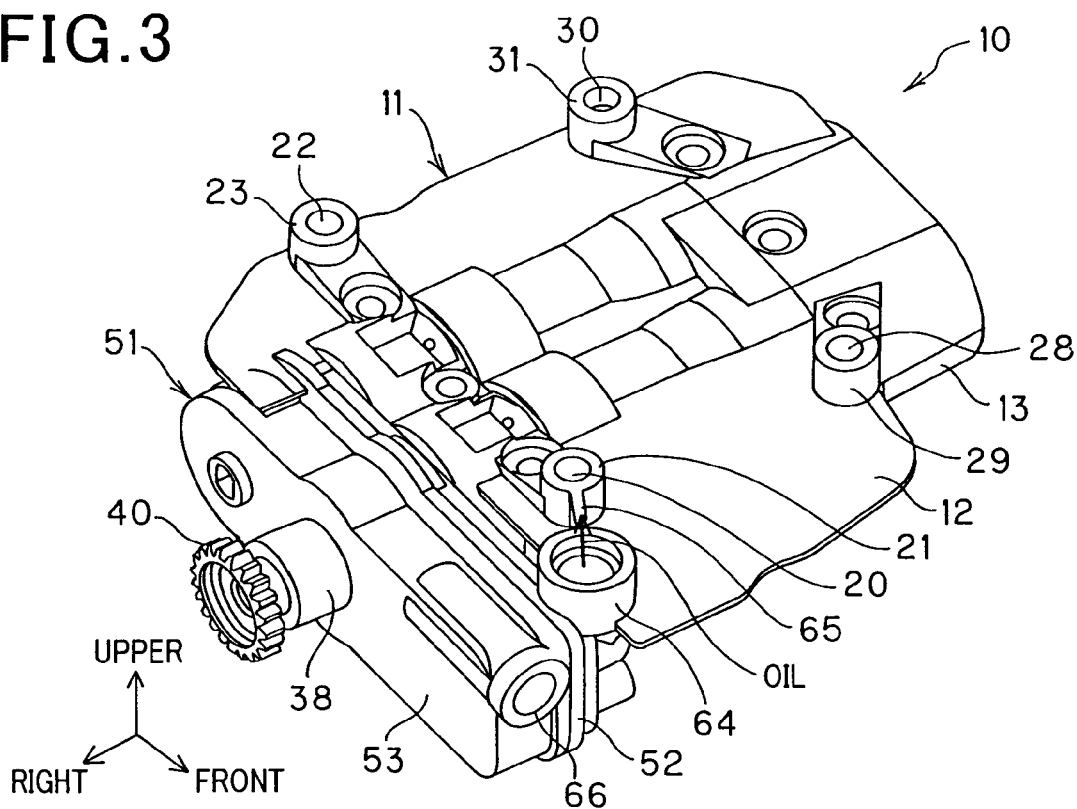
FIG. 3 is a perspective view of the balancer apparatus as viewed from an oblique upper direction.
Figure 4:
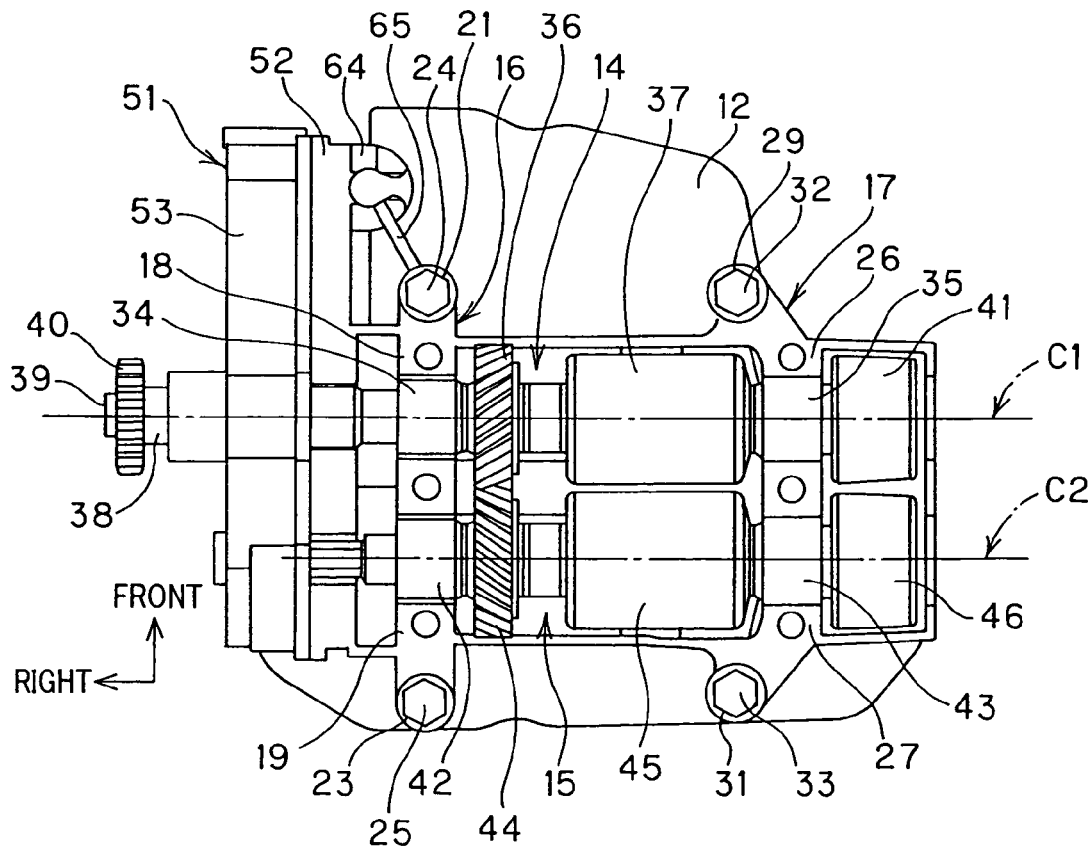
FIG. 4 is a bottom view of the balancer apparatus with a lower housing removed.

As shown in FIGS. 3 and 4, the balancer apparatus 10 has a balancer apparatus housing 11. The housing 11 is constructed by an upper housing 12 and a lower housing 13. Two balancer shafts, that is first balancer drive shaft 14 and a second balancer driven shaft 15 that rotate at a speed which is twice the speed of the crank shaft 7, are enclosed in the housing 11.

Under the crank shaft 7, the first balancer shaft 14 and the second balancer shaft 15 are arranged so that each of axes C1 and C2 extend in parallel with the crank shaft 7 and extend in parallel with a confronting surface of the lower crank casing 4 and the oil pan 5.

The first balancer shaft 14 is arranged on the vehicle forward side of the second balancer shaft 15. Therefore, the first balancer shaft 14 becomes a balancer shaft of the vehicle forward side and the second balancer shaft 15 becomes a balancer shaft of the vehicle backward side.

As shown in a bottom view of FIG. 4, in a state wherein the lower housing 13 of the balancer apparatus has been removed, the upper housing 12 of the balancer housing has a right axial-supporting portion 16 and a left axial-supporting portion 17 which are extended in the front/rear direction of the vehicle at a regular interval so that they axially support the first balancer shaft 14 and the second balancer shaft 15 which are extended in the width direction of the vehicle.

The right axial-supporting portion 16 includes: a first right bearing portion 18 for axially supporting the right side of the first balancer shaft 14; a second right bearing portion 19 for axially supporting the right side of the second balancer shaft 15; a first right engine attaching boss 21 formed with a first right bolt hole 20 to communicate with the first right bearing portion 18; and a second right engine attaching boss 23 formed with a second right bolt hole 22 to communicate with the second right bearing portion 19. A first right attaching bolt 24 is inserted into the first right bolt hole 20. A second right attaching bolt 25 is inserted into the second right bolt hole 22.

The left axial-supporting portion 17 includes: a first left bearing portion 26 for axially supporting the left side of the first balancer shaft 14; a second left bearing portion 27 for axially supporting the left side of the second balancer shaft 15; a first left engine attaching boss 29 in which a first left bolt hole 28 has been formed to communicate with the first left bearing portion 26; and a second left engine attaching boss 31 in which a second left bolt hole 30 has been formed to communicate with the second left bearing portion 27. A first left attaching bolt 32 is inserted into the first left bolt hole 28. A second left attaching bolt 33 is inserted into the second left bolt hole 30.

Although not shown, the lower housing 13 has a right axial-supporting portion and a left axial-supporting portion corresponding to the right axial-supporting portion 16 and the left axial-supporting portion 17 of the upper housing 12.

The first balancer drive shaft 14 includes: a first right journal portion 34 axially supported by the first right bearing portion 18; a first left journal portion 35 axially supported by the first left bearing portion 26; a first balancer gear 36 arranged between the first right journal portion 34 and the first left journal portion 35 and located on the first right journal portion 34 side; a first central balancer weight 37 arranged between the first right journal portion 34 and the first left journal portion 35 and located on the first left journal portion 35 side; a balancer sprocket 40 attached by a sprocket attaching bolt 39 to a front edge of an extending shaft portion 38 that projects from the housing 11 and extends on the vehicle rightward side of the first right journal portion 34; and a first edge-side balancer weight 41 supported in a cantilever state on the vehicle leftward side of the first left journal portion 35.

The second balancer driven shaft 15 includes: a second right journal portion 42 axially supported by the second right bearing portion 19; a second left journal portion 43 axially supported by the second left bearing portion 27; a second balancer gear 44 arranged between the second right journal portion 42 and the second left journal portion 43 and in engagement with the first balancer gear 36 on the second right journal portion 42 side; a second central balancer weight 45 arranged between the second right journal portion 42 and the second left journal portion 43 and located on the second left journal portion 43 side; and a second edge-side balancer weight 46 supported in a cantilever state on the vehicle leftward side of the second left journal portion 43.

As shown in FIG. 2, a balancer chain 47 is wound around the balancer sprocket 40 of the first balancer shaft 14. The balancer chain 47 is coupled with a crank sprocket 48 attached to the crank shaft 7.

In this case, the number of teeth of the balancer sprocket 40 is set to approximately half of the number of teeth of the crank sprocket 48. Therefore, when a rotation of the crank shaft 7 is propagated to the balancer sprocket 40 through the balancer chain 47, the balancer sprocket 40 rotates at approximately twice the rotational speed of the crank sprocket 48 of the crank shaft 7, that is, at twice the speed of the engine rotational speed. Thus, the first balancer shaft 14 having the balancer sprocket 40 rotates at a speed (double speed) that is twice as fast as the engine rotational speed. The second balancer shaft 15 coupled with the first balancer shaft 14 at a rotational speed ratio of 1:1 through the first balancer gear 36 and the second balancer gear 44 is also rotated at the speed (double speed) which is twice as fast as the engine rotational speed in a manner similar to the first balancer shaft 14. Consequently, a secondary vibratory force generated by the engine 1, that is, the secondary inertia force at the center of gravity of the piston 9/connecting rod 8 system can be set off or balanced.

As shown in FIG. 2, a chain tensioner 49 of the balancer chain 47 is attached to a right edge surface of the lower crank casing 4 by tensioner attaching bolts 50.

As shown in FIGS. 1 and 3, an oil pump 51 which is driven by the second balancer shaft 15 is attached to an edge portion in the longitudinal direction of the balancer apparatus housing 11, that is, a right edge portion of the housing 11. That is, the oil pump 51 is integrally provided for the right edge surface or face on the vehicle rightward side of the balancer apparatus housing 11 on the balancer chain 47 side of the balancer apparatus 10.

As shown in FIGS. 3 and 4, the oil pump 51 includes: an oil pump casing 52 directly attached to the housing 11; and an oil pump cover 53 attached to the oil pump casing 52 from the vehicle rightward side.

The oil pump 51 has, as pump rotors: an inner rotor 54 attached to a right edge of the second balancer shaft 15; and an outer rotor 55 which is in engagement with the outer peripheral side of the inner rotor 54 and is rotatable.

Thus, when the first balancer gear 36 and the second balancer gear 44 are rotated in association with the rotation of the first balancer shaft 14, the oil pump 51 is driven by the rotation of each of the inner rotor 54 and the outer rotor 55 attached to the second balancer shaft 15. Therefore, since the inner rotor 54 and the outer rotor 55 are rotated together with the second balancer shaft 15, they are rotated at a speed that is twice as fast as the engine rotational speed. Thus the rotors 54, 55 are rotated at a high speed.

As shown in FIG. 1, a pump chamber 56 of the oil pump 51, an inlet passage 57 for sucking the oil into the pump chamber 56, and a delivery passage 58 for discharging the oil from the pump chamber 56 are formed in the housing 11.

As shown in FIG. 1, the pump chamber 56 is arranged on the side of the second balancer shaft 15 located on the vehicle backward side of the two balancer shafts.

In the oil pump casing 52 and the oil pump cover 53, the inlet passage 57 and the delivery passage 58 are isolated by a partition 59 arranged in parallel with the lower surface of the lower crank casing 4 and are formed into two upper and lower stages. That is, the inlet passage 57 is formed on the lower side, the delivery passage 58 is formed on the upper side, and they are almost rectilinearly formed in the vehicle front/rear direction at a predetermined distance which is relatively long in the vehicle front/rear direction as shown in FIG. 1.

Owing to such a structure, the inlet passage 57 and the delivery passage 58 serving as oil passages before and after (upstream and downstream) of the pump chamber 56 of the oil pump 51 are formed in smooth shapes in which bending amounts are small or minimized. In this construction, even if the oil pump 51 is driven at a high rotational speed, resistance is not caused or is minimized in an oil flow.

As shown in FIG. 1, an oil strainer 60 for sucking the oil into the inlet passage 57 is arranged on the vehicle forward side of the axis C1 of the first balancer shaft 14 and is attached to a vehicle front portion of the oil pump casing 52. By arranging the oil strainer 60 to the vehicle forward side of the first balancer shaft 14 (right side of the engine 1) in the oil pan 5 as mentioned above, in the case wherein the engine 1 is transversely mounted (FF), the oil strainer 60 can certainly suck the oil when the vehicle is decelerated (G).

An oil inlet tube 62 connected to an oil inlet portion 61 communicates with the inlet passage 57 formed in the oil pump casing 52. The inlet tube 62 is coupled with the oil strainer 60. The oil inlet tube 62 constructs a pipe portion of the oil strainer 60 and is arranged on the vehicle forward side of the first balancer shaft 14 (right side of the engine 1) as shown in FIG. 1.

Due to such a construction, the oil strainer 60 can be arranged on the vehicle forward side of the first balancer shaft 14 (right side of the engine 1) through the inlet passage 57 and the oil inlet tube 62 whose bending amounts are small.

An oil outlet portion 63 in communication with the delivery passage 58 is formed in the oil pump casing 52. Further, a cylindrical coupling portion 64 connected to the oil outlet portion 63 is coupled with an upper portion of the oil pump casing 52. The coupling portion 64 has a function for coupling with the cylinder block 3 and is supported to a supporting portion 65 coupled with the first right engine attaching boss 21 as shown in FIGS. 3 and 4.

On the vehicle forward side, a relief valve receiving portion 66 is provided for the oil pump cover 53 in parallel with the coupling portion 64.

Therefore, as shown in FIG. 1, oil EO in the oil pan 5 is sucked from the oil strainer 60, passes through the oil inlet tube 62, travels from the inlet passage 57 to the pump chamber 56, and is supplied from the pump chamber 56 into the engine 1 through the delivery passage 58 and the coupling portion 64.

In this case, by arranging the oil strainer 60 and the oil inlet tube 62 to the vehicle forward side of the first balancer shaft 14 (right side of the engine 1), the bending amounts of the inlet passage 57 and the delivery passage 58 are reduced and those passages can be efficiently arranged to the edge portions of the housing 11 of the balancer apparatus 10.

As shown in FIG. 1, the inlet passage 57 and the delivery passage 58 are overlaid in the vertical direction on one side in the circumferential direction of the pump chamber 56. The inlet passage 57 and the delivery passage 58 are arranged in a state where they are rectilinearly extended from the pump chamber 56 to the vehicle forward side of the first balancer shaft 14 (right side of the engine 1).

Thus in this embodiment, while the pump chamber 56 is arranged on the side of the second balancer shaft 15 on the vehicle backward side of the two balancer shafts. The oil strainer 60 for sucking the oil into the inlet passage 57 is arranged on the vehicle forward side of the axis C1 of the first balancer shaft 14. Therefore, as shown in FIG. 1, in the case of the transverse (FF) engine, by arranging the oil strainer 60 to a position where the oil is collected at the time of the vehicle deceleration, an oil shortage is prevented and a space adapted to arrange the inlet passage 57 and the delivery passage 58 without being bent can be assured between the pump chamber 56 and the oil strainer 60.

As shown in FIG. 1, the inlet passage 57 and the delivery passage 58 are overlaid in the vertical direction on one side in the circumferential direction of the pump chamber 56, and the inlet passage 57 and the delivery passage 58 are arranged in a state where they are rectilinearly extended from the pump chamber 56 to the vehicle forward side. Therefore, the inlet passage 57 and the delivery passage 58 which are communicated with the pump chamber 56 are formed in shapes which are rectilinear as much as possible, and drive loss of the oil pump 51 which is rotated at twice the speed of the crank shaft 7 can be reduced. The inlet passage 57 and the delivery passage 58 each having a rectilinear shape are concentrated in the circumferential direction of the pump chamber 56, so that the balancer apparatus 10 can be miniaturized and the mountability of the balancer apparatus 10 to the engine 1 can be improved.

Further, as shown in FIG. 1, the inlet passage 57 and the delivery passage 58 are arranged on both of the lower and upper sides which sandwich a straight line L passing through the axis C1 of the first balancer shaft 14 and the axis C2 of the second balancer shaft 15. Thus, the rectilinear inlet passage 57 and the rectilinear delivery passage 58 are arranged at the lower and upper positions relative to the first balancer shaft 14 and the second balancer shaft 15 in a well-balanced manner. Thus the balancer apparatus 10 can be miniaturized, and the mountability of the balancer apparatus 10 to the engine 1 can be improved.

Moreover, as shown in FIG. 1, the rectilinear delivery passage 58 is arranged over the inlet passage 57 and a downstream edge portion of the rectilinear delivery passage 58 is coupled with the oil passage in the cylinder block 3 through the cylindrical coupling portion 64 extending in the cylinder center line CL direction or parallel to the CL direction. Thus, a passage structure of the inlet passage 57 and the rectilinear delivery passage 58 is simplified and the drive loss of the oil pump 51 can be reduced. A vehicle front edge portion of the inlet passage 57 is supported or coupled to the cylinder block 3 by the coupling portion 64 for coupling the rectilinear delivery passage 58 with the cylinder block 3. Thus the number of dedicated supporting portions can be reduced, the balancer apparatus 10 can be miniaturized, and the mountability to the engine 1 can be improved.

Although a particular preferred embodiment of the invention has been disclosed in detail for illustrative purposes, it will be recognized that variations or modifications of the disclosed apparatus, including the rearrangement of parts, lie within the scope of the present invention.

The invention claimed is:

1. A balancer apparatus of a vehicle engine comprising a balancer apparatus housing for enclosing two balancer shafts that are rotatable at twice the speed of a crank shaft, said housing being arranged under a cylinder block whose cylinder center line is inclined in a forward direction of a vehicle, an oil pump which is driven by said balancer shafts is attached to an edge portion in a longitudinal direction of said housing, and wherein a pump chamber of said oil pump, an inlet passage for sucking oil into said pump chamber, and a delivery passage for discharging the oil from said pump chamber are formed in said housing, wherein said pump chamber is arranged on the side of the balancer shaft on the vehicle backward side of said two balancer shafts, an oil strainer for sucking the oil into said inlet passage is arranged on the vehicle forward side of an axis of the balancer shaft on the vehicle forward side of said two balancer shafts, wherein said inlet passage and said delivery passage are overlaid in the vertical direction to one side in the circumferential direction of said pump chamber, and said inlet passage and said delivery passage are arranged in a state where they are rectilinearly extended from said pump chamber in the vehicle forward direction.

2. A balancer apparatus of the engine according to claim 1, wherein said inlet passage and said delivery passage are arranged on both of upper and lower sides which sandwich a straight line passing through the axes of said two balancer shafts.

3. A balancer apparatus of the engine according to claim 2, wherein said delivery passage is arranged over said inlet passage and a downstream edge portion of said delivery passage is coupled with an oil passage of said cylinder block through a cylindrical coupling portion extending in a cylinder center line direction.

* * * * *